Jan. 19, 1954 R. B. COLTON ET AL 2,666,845

TWO-WAY COMMUNICATION SYSTEM

Filed Nov. 28, 1951 4 Sheets-Sheet 1

INVENTORS
ROGER B. COLTON
EMILE LABIN
GEORGES A. DESCHAMPS
BY Percy P. Lantzy
ATTORNEY Jan. 19, 1954 R. B. COLTON ET AL 2,666,845

TWO-WAY COMMUNICATION SYSTEM

Filed Nov. 28, 1951 4 Sheets-Sheet 2

INVENTORS
ROGER B. COLTON
EMILE LABIN
BY GEORGES A. DESCHAMPS
Percy P. Lantzy
ATTORNEY Jan. 19, 1954 R. B. COLTON ET AL 2,666,845

TWO-WAY COMMUNICATION SYSTEM

Filed Nov. 28, 1951 4 Sheets-Sheet 3

INVENTORS
ROGER B. COLTON
EMILE LABIN
GEORGES A. DESCHAMPS
BY Percy P. Lantzy
ATTORNEY Jan. 19, 1954 R. B. COLTON ET AL 2,666,845

TWO-WAY COMMUNICATION SYSTEM

Filed Nov. 28, 1951 4 Sheets-Sheet 4

INVENTORS
ROGER B. COLTON
EMILE LABIN
GEORGES A. DESCHAMPS
BY *Percy P. Lantzy*
ATTORNEY Patented Jan. 19, 1954 | 2,666,845

UNITED STATES PATENT OFFICE 2,666,845

TWO-WAY COMMUNICATION SYSTEM

Roger B. Colton, Emile Labin, Georges A. Deschamps, New York, N. Y., assignors to Federal Telecommunication Laboratories, Incorporated, Nutley, N. J., a corporation of Delaware Application November 28, 1951, Serial No. 258,584

22 Claims. (Cl. 250—15)

This invention relates to communication systems and more particularly to such a system, either radio or waveguide, employing two-way repeaters on a time division basis.

Communication systems employing either radio links or waveguides over long distances require one or more repeater or relay stations along the path of transmission. Where the system is provided for two-way communication, either separate repeaters for each direction must be provided or a repeater capable of two-way operation. The two-way type of repeater is particularly desirable since it would require much less apparatus than a relay station employing two directive repeaters. U. S. Patent to G. J. Lehmann, No. 2,533,269, December 12, 1950, discloses a two-way repeater employing a single transmitter and a single receiver but it requires a special antenna arrangement and adjuncts for switching directivity of transmission for two-way operation.

It is one of the objects of the present invention to provide a two-way communication system employing relatively simple two-way repeaters which avoids the necessity of having special directive antenna switching systems.

Another object of the invention is to provide a two-way communication system having a time division basis whereby each repeater station operates to transmit signals received from one direction during one portion of the time division cycle, to transmit signals received from a second direction during a second portion of the time division cycle, and to be inoperative during a third portion of the cycle so as to block reception back of signals which the station has previously transmitted.

Still another object of the invention is to provide a simplified two-way repeater for use in two-way single or multichannel communication systems which is capable of repeater operation in both directions either on two different carrier frequencies or on the same carrier frequency.

One of the features of the invention is the time-division principle on which the terminal and repeater stations operate. By a proper selection of timing for transmission of signals in the two directions and selective blocking of the receiver operation, directive transmission is obtained without the necessity of special antenna directive switching arrangements or the need of a multiplicity of carrier frequencies. This time-division signal cycle may be varied depending upon the intelligence or the type of signal to be transmitted. Signal compression and/or pulse modulation may be employed. Where signal compression is used, the compressed signals may be transmitted as signal sections or slugs which are expanded at the receiver. Where pulse modulation is employed, any of the pulse modulation principles, either amplitude, width, time, phase, or code, may be used. In pulse multiplex systems, for example, a sampling rate may be such as to sample a number of separate channels and interleave the pulses carrying information of a plurality of channels into a pulse train within the portion of the time-division cycle provided for transmission in one direction. By dividing a given period of time into three substantially equal parts, maximum use can be made of the repeaters. Each repeater can then be arranged to repeat a signal train received from one direction during the first part, to repeat another signal train received from the other direction of transmission during the second part, and to be rendered inoperative during the third part. This inoperative portion of the signalling cycle is necessary to insure proper directivity of transmission.

Instead of grouping channel pulses into pulse trains, the time division may be made much smaller so that each separate transmission in one or the other direction is for a single channel. Such single channel time division may be used for single channel two-way transmission or for multiplexing. Where a series of different channels are multiplexed on a single channel time division basis "cross-talk" between successive channels is substantially entirely eliminated since no channel follows directly any other channel without a time interval including a blanking period therebetween.

Another feature of the invention is the provision of a delay period in the repeating operation of at least certain of the repeaters. This delay feature permits location of repeaters at choice locations since the delay feature makes it possible to adjust for any desired time spacing regardless of the actual distance spacing of the repeaters.

Still another feature of the invention is the two-way transmission of signals over one selected carrier frequency utilizing common antenna systems for radio links, and where waveguide systems are employed, the use of a single waveguide connection for two-way transmission. Regardless of the type of link, whether radio or waveguide, the desired directivity is performed by a combination of repeater blocking and the use of directive couplers.

The above-mentioned and other features and objects of this invention and the manner of attaining them will become more apparent by reference to the following description taken in conjunction with the accompanying drawings, wherein.

Figure 1:
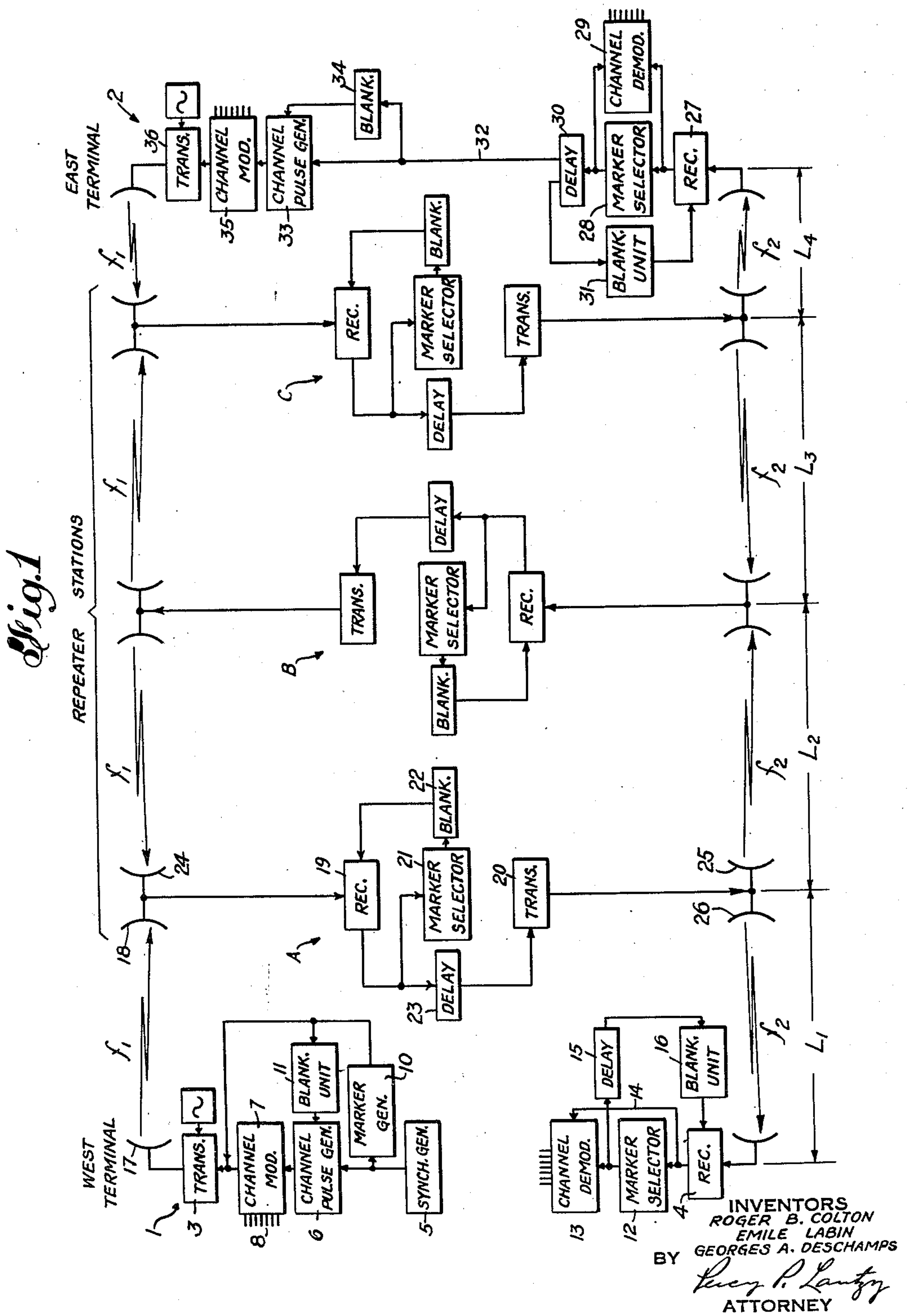
Fig. 1 is a block diagram of a two-way communication system, according to the present invention, employing two carrier frequencies for two-way transmission.
Figures 2, 3, 4, 5:
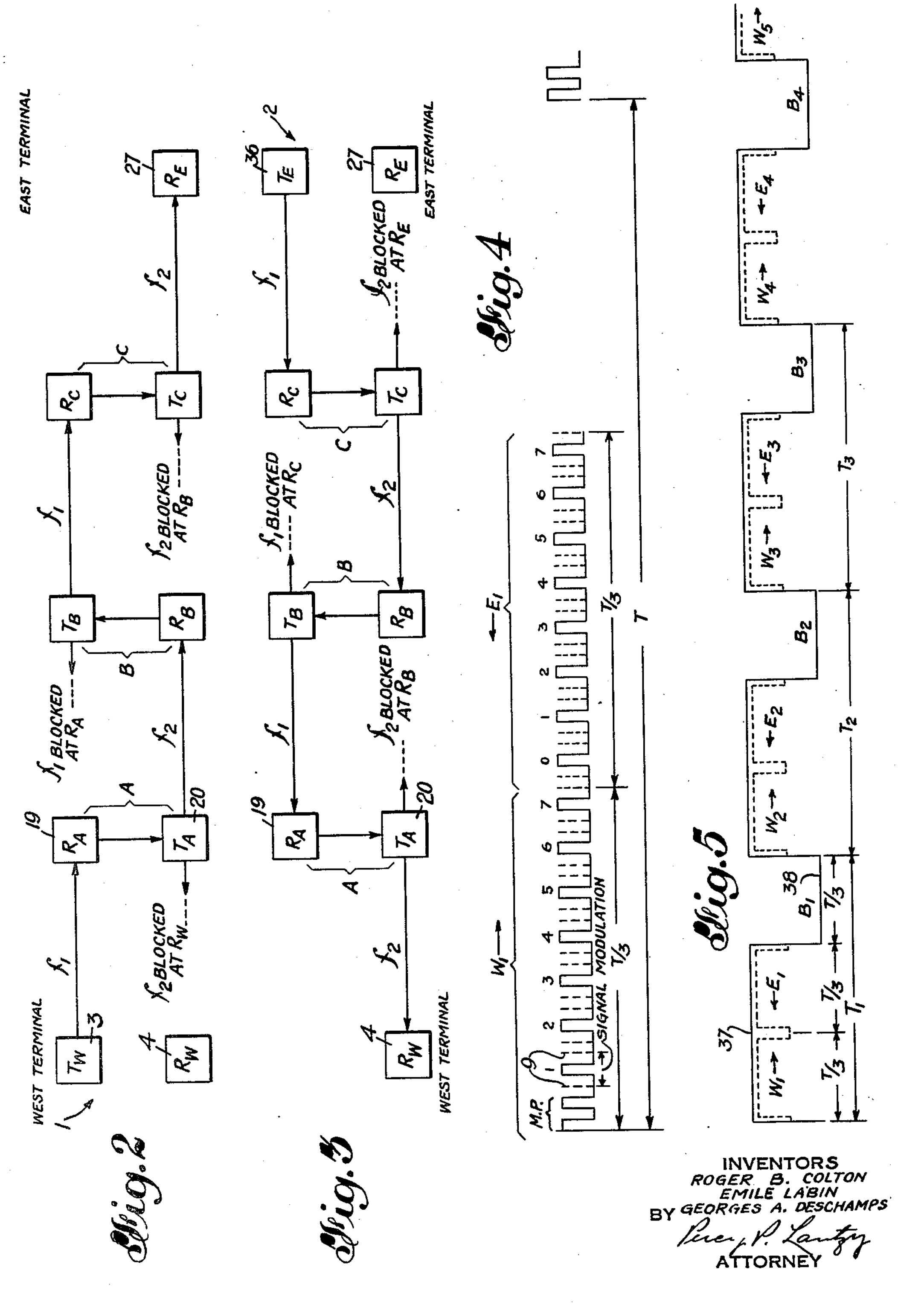
Figs. 2 and 3 are schematic illustrations helpful in explaining the directive two-way communication of the system illustrated in Fig. 1.
Fig. 4 is a graph indicating a multichannel pulse train in accordance with the time-division transmission feature of the invention.
Fig. 5 is a graph illustrating the time-division of the signalling cycle at each repeater.

Referring to Fig. 1, a two-way communication system is illustrated for operation on a time-division basis in accordance with the principles of this invention. The system as shown comprises a west terminal 1 and an east terminal 2 with three repeater stations A, B, and C interposed at spaced points therebetween. A less or greater number of repeaters may, of course, be used. Some links may require only one while other links may require several repeaters. The west terminal comprises a transmitter 3 and a receiver 4. Associated with the transmitter 3 is a synchronizing generator 5, a pulse generator 6 controlled thereby for production of channel pulses which are applied to a channel modulator 7 whereby the pulses are modulated with the intelligence of a plurality of channels 8. The type of pulse modulation may comprise any one of a number of different pulse modulation principles, such as pulse amplitude, width, time, or code modulation. For purposes of illustration, a system of pulse time modulation will be described. In Fig. 4, for example, a pulse train comprising a marker pulse MP is shown followed by a train of seven channel pulses. The marker pulse in the present illustration comprises a double pulse which is distinguished by the spacing thereof from the channel pulses. Other methods of distinguishing a marker or synchronizer pulse may, of course, be used. Each channel pulse represents the sampling of the intelligence of the signal of a particular channel and the amplitude of the sampled signal is indicated by the time position of the pulse between the modulation limits indicated by the broken lines 9. The pulses representing channels one to seven are interleaved in time so that for a given time cycle T only one pulse per channel is included.

For further information on pulse time modulation systems, reference may be had to the following U. S. Patents: E. Labin and D. D. Grieg, 2,429,631; E. Labin and D. D. Grieg, 2,438,928; D. D. Grieg, 2,445,775; D. D. Grieg, A. Levine and S. Moskowitz, 2,490,801; D. D. Grieg, 2,547,001.

Referring back to Fig. 1, the transmitter 3 also has associated therewith a marker pulse generator 10 controlled by generator 5 to produce the synchronizing or marker pulse MP which is interleaved in a desired location in the multichannel pulse train. The marker pulse is also applied to a blanking unit 11 which in turn produces a control wave which determines the number of pulses applied to the modulator 7 dependent on the number of channels and the portion of the time cycle utilized for transmission of signals by the west terminal. The receiver of the west terminal has associated therewith a marker pulse selector unit 12 adapted to select the marker pulse from the pulse train for use in controlling operation of the channel separator and demodulator 13, the pulse train being applied to the unit 13 by way of connection 14. The marker selector also applies the marker pulse to a delay unit 15 from which it is applied to a blanking unit 16 which produces a control wave for blanking the receiver during the period when the receiver is subjected to back radiation of pulses from the next adjacent repeater A. This blanking operation will be discussed further in connection with Figs. 2, 3, 4, and 5.

The transmission from west terminal 1 is preferably beamed, utilizing a carrier frequency $f_1$, by an antenna-reflector unit 17 to the antenna unit 18 of repeater A. The antenna-reflector units may be of any known form, a suitable form being a half-wave dipole mounted at the focal point of a parabolic reflector. The repeater A comprises, in addition to the antenna unit 17, a receiver 19, a transmitter 20, a marker pulse selector 21, a blanking unit 22, and a delay unit 23. The repeater station also includes three additional antenna units, a unit 24 connected together with antenna unit 18 to the input of receiver 19 and antenna units 25 and 26 connected to the output of transmitter 20. Four antennas have been shown for the repeater station for ease of explanation, it being clear to those skilled in the art that one set of antennas, such as 18 and 24, could be used with both the receiver and transmitter. Another repeater embodiment shown in Fig. 7, for example, employs one such set of antenna units.

The repeater operation is based on a time-division signalling cycle, the receiver responding to the carrier frequency $f_1$ from either west or east, as the case may be, for one portion of the cycle. The received signals during this period are applied simultaneously to the marker selector 21 and the delay unit 23. The marker selector responds to the marker pulse MP to produce by way of unit 22 a control voltage which maintains the receiver 19 receptive during the first two portions or two-thirds of the cycle, and then inoperative for the third or remaining one-third portion of the cycle. The signals received during the first portion of the cycle are applied with or without delay, as the case may be to transmitter 20 which transmits the signals in both directions over antennas 25 and 26 on carrier frequency $f_2$.

The repeaters B and C are identical to the repeater A except that the receiver for station B is responsive only to carrier frequency $f_2$, whereas the receiver for stations A and C are responsive to carrier frequency $f_1$. Likewise, the transmitter for station B transmits on carrier frequency $f_1$ and the transmitter for station C transmits on carrier frequency $f_2$.

The east terminal 2 is similar to the west terminal except that it is shown to be a slave station to the synchronizing signal transmitted from the west terminal. The receiver 27 of the east terminal has associated therewith a marker selector 28, a channel separator and demodulator 29, a delay unit 30 and a blanking unit 31. The delay unit 30 is provided with a connection 32 for application of the marker pulse, suitably delayed, for control of the transmitting apparatus, which as shown, comprises a channel pulse generator 33, blanking unit 34, channel modulator 35, and a transmitting unit 36. The channel pulses transmitted by east terminal 2 are transmitted on carrier frequency $f_1$ and are timed to enter the receiver of repeater C in sequence with the signal train received from the west and while the receiver is operative.

To assist in understanding the operation of the time-division signalling method of transmission, reference should be had to Figs. 2 to 6 in conjunction with the illustration of Fig. 1. Fig. 2 illustrates the transmission of signals from west to east while Fig. 3 represents the transmission of signals from east to west. Fig. 5 illustrates the time-division principle as it is performed at each repeater and terminal station, whether transmission is by "single channel time division" or on a larger time basis to accommodate channel pulse trains such as illustrated in Fig. 4. The blanking units at the different stations are of the multivibrator or similar type, whereby a rectangular waveform is produced, such as illustrated at 37 and 38, Fig. 5. The portion 37 covers two-thirds of the signalling cycle $T_1$. The blanking portion 38 is of a duration corresponding to one-third of the cycle. The signal train transmitted from the west terminal 1 is represented in Fig. 4 at $W_1$ and again by the dotted portion $W_1$ in Fig. 5. A similar pulse train transmitted from the east terminal 2 is represented by the dotted portion $E_1$, Figs. 4 and 5. In the system illustrated in Fig. 1, it is not necessary for a marker pulse to be transmitted from east to west, so if desired, an additional channel (o) may be substituted for the space normally occupied by the marker pulse. These two signal trains $W_1$ and $E_1$ are transmitted in opposite directions so that at repeater station A, for example, the signal train from the west terminal, represented by $W_1$ in Fig. 5, is first received by the station receiver and transmitted after amplification by transmitter 20. The signal train $E_1$, Fig. 5, is next received and transmitted by transmitter 20. The receiver 19 is then blocked for an interval $B_1$ by pulse portion 38 from the blanking unit 22 for the remaining third of the signalling interval $T_1$. After this blanking interval $B_1$ the receiver next received signal train $W_2$, then $E_2$ and again rendered inoperative during interval $B_2$, etc., as indicated for the successive cycles illustrated in Fig. 5.

Referring particularly to Fig. 2, the pulse train from the west terminal 1 may be traced through the system as follows: The pulse train is transmitted from terminal 1 on carrier frequency $f_1$ to the receiver 19 of repeater station A. After amplification, the pulse train is retransmitted at 20 on frequency $f_2$ in both directions over antennas 25 and 26, Fig. 1. By the time this signal train reaches receiver 4 of terminal 1, the receiver will be blocked. The signal trains, to the east, however, will be received by receiver $R_B$ of repeater station B and will again be transmitted at $T_B$ in opposite directions on carrier frequency $f_1$. By the time this transmission reaches repeater A, the receiver 19 thereof will be blocked. The receiver $R_C$ at repeater C, however, will be operative and will receive the signal train which will be in turn transmitted in opposite directions at $T_C$ on carrier frequency $f_2$. The receiver at repeater B will be blocked when this signal train reaches repeater B but the receiver 27 of each terminal 2 will be operative and will receive the signal train.

Figure 7:
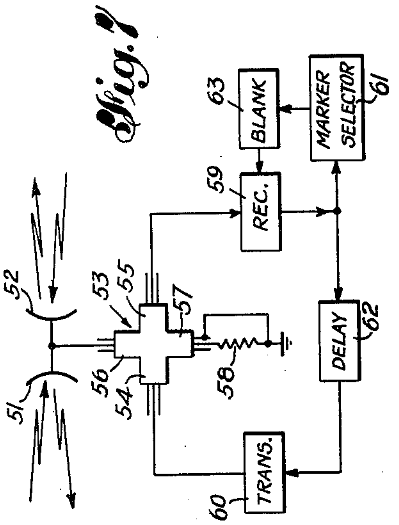
Fig. 7 is a block diagram of a repeater employing a single antenna system capable of operating on either a single carrier frequency or two carrier frequencies.

Following the diagram of Fig. 3, the eastward transmission from the east terminal follows a similar path through the repeater C, B, and A to receiver 4 of the west terminal. The fact that each receiver of the repeaters and the terminals is blocked during one-third of the signal cycle insures directive transmission of the signal train through the system. This time-division plan not only simplifies the repeater stations in that the transmitter and receiver units are used for amplification of the signals in both directions, but the antenna system may also be simplified, as indicated in Fig. 7, for example.

Figure 6:
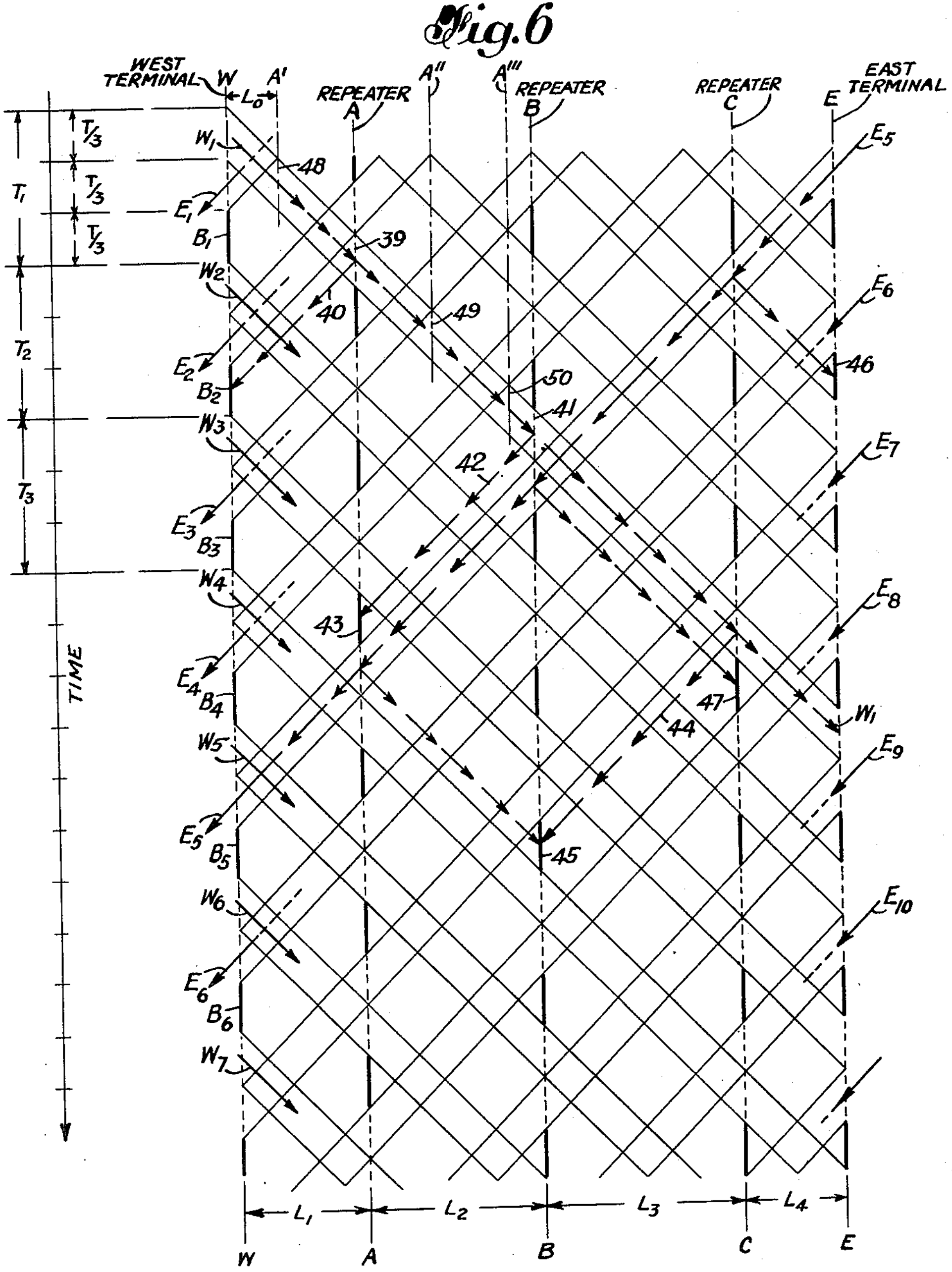
Fig. 6 shows another graph illustrating in more detail the operation of the signal-division cycle at a series of repeaters in a two-way transmission system, such as illustrated in Fig. 1, indicating how directive transmission is obtained by the time-division operation.

In Fig. 6 the chart shows the positions of the west and east terminals by the letters W and E, with the positions of the repeaters A, B, and C therebetween. The ordinates of the chart represent time, while the abscissa represents distance. The distances between successive stations are indicated as $L_1$, $L_2$, $L_3$, and $L_4$ each of which is purposely selected different from the others to best illustrate the flexibility of the system. Arrow $W_1$ represents a signal train of pulses transmitted by the west terminal and arrow $E_1$ represents the train of pulses from the east terminal, similarly as indicated in the diagrams of Figs. 4 and 5. Directly following transmission of signal train $W_1$, the receiver of the west terminal will receive signal train $E_1$ from the east. The heavy line $B_1$ represents the blanking period at the west terminal W. These three intervals occupied by $W_1$, $E_1$, and $B_1$ represent one complete signalling cycle $T_1$ at terminal W. Likewise, the next cycle $T_2$ is occupied by $W_2$, $E_2$, and $B_2$; the third cycle $T_3$ is occupied by $W_3$, $E_3$, and $B_3$, etc.

Following the arrows for the signal train $W_1$, it will be noted that the train is propagated diagonally across the chart coming out at the east terminal E a little more than half way down the chart. It should be noted that in the transmission of this signal train through repeaters A, B, and C, such transmission occurs during the intervals when the repeater stations are operative. The blanking operation is important in order to insure directivity and thus avoid the return of a signal train which has been previously transmitted by a terminal or repeater station. By way of illustration, reference is made to the interval indicated at 39 in line with repeater station A. Since the re-transmission at repeater A is in opposite directions, arrow 40 represents the return transmission toward the west terminal. Since the receiver of the west terminal is blocked during interval $B_2$, this signal train is not received back by the west terminal. Following the arrows of $W_1$ to point 41 on the ordinate of repeater B, it will be noted that the back transmission 42 is blocked at repeater A by blocking interval 43. The transmission back at station C as indicated at 44 is likewise blocked at station B as indicated by the blocking interval 45. It is clear, therefore, that the transmission in accordance with the time-division method of the present invention is directive through the chain of relay stations. A similar trace of the east and west transmission is indicated for signal trains $E_5$. The re-transmission back at each of the repeaters C, B, and A in turn is blocked first by the receiver at terminal E as indicated at 46, next by station C at 47, and next by repeater B at 45. It is only necessary to block the signal train at one repeater since "line of sight" and directivity renders it easy to avoid reception back beyond the first repeater in the direction opposite to the desired direction of transmission.

The chart of Fig. 6 clearly shows that by predetermined location of the repeaters between two terminals, a time-division of the transmission from east to west and from west to east is possible, utilizing the same transmitter-receiver equipment for both transmissions at the repeaters. The chart also indicates other possible locations than those selected for A, B, and C. The location of A′, a distance $L_0$ from the west terminal, indicates the shortest distance for such a time division signalling cycle. Assuming that the first repeater is located a distance $L_0$ from the west terminal, it will be noted that any re-transmission back during the period indicated at 48 would cause the back transmission to occur at the receiver of the west terminal during the blocking interval $B_1$. Thus, the location A′ is satisfactory for the first repeater. The next position is that indicated by A, a distance $L_1$, which is equal to substantially two and a half times the distance $L_0$. The third position suitable for the first repeater is indicated at A″, a distance equal to substantially $4L_0$. The re-transmission back at 49 would then be in line with the blanking period $B_3$ at the west terminal. Still another location suitable for the first repeater is indicated at A‴, a distance equal to substantially $5\frac{1}{2}L_0$, and the re-transmission back from 50 would be in line with the blanking period $B_4$. The point to be made here is that should the terrain be such that none of these positions A, A′, A″, or A‴ would be satisfactory, but that some other location in between two of these theoretical sites is best, then the difference in time may be provided by proper adjustment of the delay unit 23, repeater A, Fig. 1. It is thus desirable that at least certain of the repeaters be provided with a delay unit to locate them in accordance with selected time locations in the transmission path.

Referring to Fig. 7, a repeater station is shown provided with one antenna assembly 51, 52. Different carrier frequencies may be used with such an antenna coupling for a repeater having a receiver tuned to receive one carrier and a transmitter to operate on the other carrier frequency. In Fig. 7, however, the same carrier frequency may be used for transmission in both directions. The common connection to the antennas 51 and 52 is applied to one leg of a magic T coupler 53. The magic T coupler is provided with two legs 54 and 55 which pass signals received over the intermediate leg 56. The fourth leg 57 is connected to a matching terminating impedance 58. The received signal is thus passed to the receiver 59 and transmitter 60. Since the transmitter output stage blocks the incoming signal no interference is experienced. The repeater station, however, receives the incoming signal and applies it to the marker separator 61 and delay unit 62, as previously described. The marker selector applies the marker pulse to the blanking unit 63 to control the operating cycle of the receiver 59. The signals re-transmitted after amplification at transmitter 60 is applied to the magic T through the leg 54. The signal output is coupled to the antenna system through leg 56 and to the matching impedance 58. No signal flow from transmitter 60 passes through leg 55.

Figure 8:
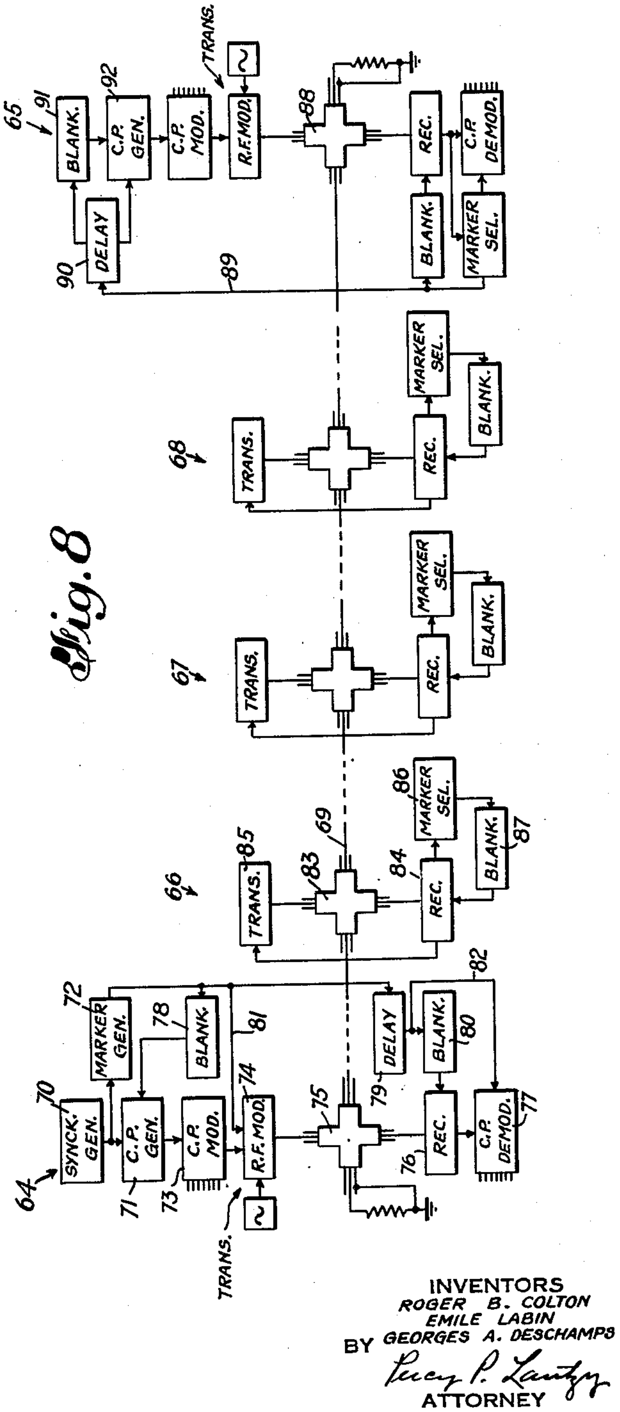
Fig. 8 is a block diagram of a two-way communication system employing waveguide lines between repeaters for operation on the time-division cycle of the present invention.

In Fig. 8, a two-way communication system is shown embodying a waveguide as the means for coupling the repeaters and terminal stations. The system comprises a first terminal 64 and a second terminal 65 with three repeater stations 66, 67, and 68 interposed at spaced points therebetween and interconnected by a waveguide 69. The waveguide may comprise a coaxial cable, a line-above-ground waveguide, a tubular waveguide or other conductive means. The terminal 64 comprises a synchronizing generator 70 which controls a channel pulse generator 71 and a marker generator 72. The channel pulses are applied to a channel pulse modulator 73 for multiplexing, the output of which is applied to a carrier frequency modulator 74 for transmission over the waveguide through a magic T coupler 75 similar to the magic T coupler 53 of Fig. 7. The terminal includes a receiver 76 coupled to the magic T 75, the output of which is demodulated at 77. To control the terminal operation according to the time division cycle, the marker pulse from generator 72 is applied first to a blanking unit 78 for control of the transmission and then to a delay unit 79 from which it is applied for controlling a blanking unit 80 which renders the receiver 76 inoperative during the portion of the time division cycle that signals are transmitted back from the next adjacent repeater 66. The marker pulse from generator 72 is applied over connection 81 to the modulator 74 for inclusion in the pulse train transmitted, and after a suitable delay at 79 through connection 82 to the demodulator 77 for control of the pulse separation and demodulator function.

Each repeater comprises a magic T coupler 83, one leg of which is connected to a receiver 84 and another leg of which is connected to a transmitter or carrier frequency amplifier 85. Associated with the receiver 84 is the marker selector unit 86 and blanking unit 87 which operates in the manner described in connection with the repeaters of Fig. 1. At terminal 65 a magic T coupler 88 is provided for coupling the transmitter and receiver to the waveguide. The receiver portion of the terminal is the same as for terminal 2 in Fig. 1, except that no delay unit is provided. The transmitter portion of the terminal is substantially identical to the transmitter portion of terminal 2 in Fig. 1 except that the marker pulse received over connection 89 from the receiver side is applied to a delay unit 90 whereby the marker pulse is selectably delayed for control of the blanking unit 91 and the channel pulse generator 92.

In the operation of the system of Fig. 8, the time division at each of the terminals and repeater stations is in accordance with the time division hereinbefore explained. The use of a conductive line between terminals and repeater stations removes the need of delay units since the repeaters may be selected at the most advantageous points along the system, that is, at those points where the time division cycle for each station properly dovetails with the cyclic operation of the adjacent stations. However, if a different time spacing from actual spacing is desired, delay units may be included as described in connection with repeaters of Figs. 1 and 7. The desired blocking between the transmitter and receiver at the magic T couplers is the same as explained in connection with Fig. 7.

Figure 9:
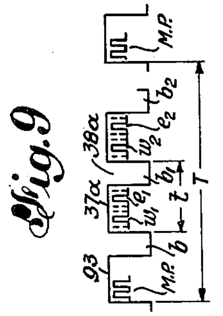
Fig. 9 is a graph illustrating operation of the two-way repeater systems on a sub-division cycle per channel.

The graph of Fig. 9 illustrates single channel time division operation. The graph is similar to Fig. 5 in that a control potential 93 is indicated having portions 37a and 38a, the portion 37a representing the part of the cycle during which a station is rendered operative and the portion 38a the part of the cycle during which the station is rendered inoperative. The multiplex feature illustrated in this figure provides for a synchronizing pulse MP followed by a series of channel pulses propagated from the west terminal as indicated by $w_1$, $w_2$, etc., and a second series from the east terminal as indicated by $e_1$, $e_2$, etc., interleaved together with blanking periods $b_1$, $b_2$, etc. The major cycle for the number of channels being transmitted is represented by T, the same as in Fig. 4. The sub-cycle represented by $t$ is the time sharing cycle for operation at each station, one-third of which is for transmission of a signal pulse for one channel in one direction, a second third for transmission of a signal pulse for another channel in the opposite direction and a final third for blanking operation. This method of multiplexing separates the channel pulses transmitted in the same direction by substantially two-thirds of the cycle $t$, and thereby substantially entirely eliminates crosstalk between adjacent channels. If multiplexing is not employed, then the cycle $t$ will be repeated for successive signals at a high sampling rate for the same two channels $w$ and $e$. For single channel two-way transmission, the signal samples, however, may be of a time duration much greater, if desired, than that required for multiplexing.

While we have described above the principles of our invention in connection with specific apparatus, it is to be clearly understood that this description is made only by way of example and not as a limitation to the scope of our invention as set forth in the objects thereof and in the accompanying claims. For example, the terminal apparatus may be varied widely depending upon the type of signal modulation and demodulation principle employed. Also the synchronizing generator, the marker generator, and the blanking unit arrangement may be consolidated and thus quite different from the arrangements shown.

We claim:

1. A two-way communication system comprising a first terminal station, a second terminal station and a two-way repeater station interposed between the two terminal stations, each said station having a transmitter and a receiver, means at each of said stations to control transmission and reception at said stations on a time division basis including three parts, one for transmission of a signal in one direction, a second for reception of a signal from another direction and the third for blocking reception back of signals previously transmitted from such station, and means for synchronizing said control means to effect directional communication between said terminal stations utilizing said repeater station for both directions of communication.

2. A two-way communication system according to claim 1, wherein the means to control transmission and reception includes means for producing a control wave, each cycle of which renders the receiver of a station operative for substantially two-thirds of the cycle and inoperative during the remaining third of the cycle.

3. A two-way communication system according to claim 1, wherein the means synchronizing includes means for transmission from one of said stations of a synchronizing marker signal and each of the other stations includes means responsive to reception of said marker signal to block operation of the receiver of such station during said third part of said time basis.

4. A two-way communication system according to claim 1, wherein said repeater station includes a delay unit to lengthen the effective time spacing between it and said terminal stations.

5. A two-way communication system according to claim 1, wherein the receiver of each station is operative at one particular carrier frequency and the transmitter of the same station is operative at a different carrier frequency.

6. A two-way communication system according to claim 1, wherein the receiver and transmitter of each station has a common input and output connection for operation at substantially the same carrier frequency, and a device for coupling incoming signals to the receiver and blocking reception at the receiver of signals transmitted by the transmitter of such station.

7. A two-way communication system according to claim 6, wherein said common connection is a two-way antenna system and said device is a magic T type of coupler.

8. A two-way communication system according to claim 6, wherein said common connection comprises a waveguide system and said device is a magic T type of coupler.

9. A two-way communication system comprising a first terminal having means to transmit a signal during one portion of a time division cycle, a second terminal having means to transmit a signal during another portion of said time division cycle, a plurality of two-way repeaters interposed at spaced points between said first and second terminals, each repeater having a receiver and a transmitter, said repeaters being time spaced to receive and transmit, first a signal from one of said terminals, and then a signal from the other of said terminals, and means at each of said repeaters to block the receiver thereof during a third portion of said time division cycle, and means for synchronizing the blocking means of said repeaters with the transmitting means of said terminals.

10. A two-way communication system according to claim 9, wherein each of said terminals includes a receiver and means to block the receiver thereof during a third portion of said time division cycle.

11. A two-way communication system according to claim 9, wherein said time division cycle includes three parts and each repeater includes means to maintain the repeater operative for signal reception during two of the parts of said cycle and inoperative to reception of signals during the third part of said cycle.

12. A two-way communication system according to claim 9, wherein the means to block reception at each repeater includes means to condition the repeater for reception of signals during two-thirds of said time division cycle and to block reception operation of the repeater the remaining third of said cycle.

13. A two-way communication system according to claim 9, wherein the first terminal includes means for transmission of a synchronizing marker signal and each repeater includes means responsive to reception of said marker signal to control operation of the blocking means at each repeater.

14. A two-way communication system according to claim 9, wherein at least one of said repeaters includes a delay unit for lengthening the effective time spacing between it and adjacent transmitters.

15. A repeater for a two-way communication system comprising means to receive signals from both directions along the line of communication, means to transmit signals in both directions and means controlling operation of the repeater in accordance with a time division cycle, first, to render the repeater operative to reception of signals during substantially two-thirds of said time division cycle, and, second, to render the repeater inoperative to reception of signals during the other one-third of said cycle.

16. A repeater according to claim 15, wherein the repeater includes a delay unit whereby the effective time spacing between repeater and adjacent transmitting stations is lengthened by the delay characteristic of the delay unit.

17. A repeater according to claim 15, wherein the signals transmitted by the system includes a synchronizing signal and the repeater includes means for detecting said synchronizing signal and to apply said synchronizing signal to the means for controlling operation thereof.

18. A repeater according to claim 15, wherein the transmitter operates on one carrier frequency and the receiver is responsive to a different carrier frequency.

19. A repeater according to claim 15, wherein the transmitter and the receiver operate on the same carrier frequency.

20. A repeater according to claim 15, wherein the transmitter and receiver have a common input and output connection and a device which suppresses transmission between the output of said transmitter and the input to said receiver.

21. A repeater according to claim 20, wherein the common connection includes a two-way antenna system and said device comprises a magic T type of coupler.

22. A repeater according to claim 20, wherein the common connection includes a waveguide and said device comprises a magic T type of coupler.

ROGER B. COLTON.
EMILE LABIN.
GEORGES A. DESCHAMPS.

References Cited in the file of this patent

UNITED STATES PATENTS

| Number | Name | Date |
|---|---|---|
| 2,375,223 | Hansen et al. | May 8, 1945 |
| 2,471,416 | Deloraine et al. | May 31, 1949 |
| 2,477,428 | Sprague et al. | July 26, 1949 |
| 2,489,273 | Dodington | Nov. 29, 1949 |
| 2,498,635 | Bailey | Feb. 28, 1950 |
| 2,520,534 | Edson | Aug. 29, 1950 |
| 2,533,269 | Lehmann | Dec. 12, 1950 |
| 2,543,454 | Gaerttner | Feb. 27, 1951 |